United States Patent [19]

Kanbe et al.

[11] 3,956,610
[45] May 11, 1976

[54] METHOD FOR WELDING IRON STEEL AND NONFERROUS ALLOY

[75] Inventors: Yoshio Kanbe, Narashino; Takao Ishii, Funabashi; Kazuo Nagatomo, Narashino; Hirohisa Fujiyama, Tokyo; Tsuyoshi Takino, Yachiyo, all of Japan

[73] Assignee: Nippon Steel Corporation, Tokyo, Japan

[22] Filed: July 16, 1973

[21] Appl. No.: 379,225

Related U.S. Application Data

[63] Continuation of Ser. No. 188,211, Oct. 12, 1971, abandoned.

[30] Foreign Application Priority Data

Oct. 13, 1970 Japan............................ 45-89309
Oct. 24, 1970 Japan............................ 45-93186
Nov. 17, 1970 Japan............................ 45-100748
Dec. 1, 1970 Japan............................ 45-105472
Mar. 24, 1971 Japan............................ 46-16496

[52] U.S. Cl.......................... 219/137 PS; 219/131 F
[51] Int. Cl.².......................................... B23K 9/12
[58] Field of Search ............... 219/137, 136, 131 F, 219/130, 126

[56] References Cited

UNITED STATES PATENTS

| | | | |
|---|---|---|---|
| 3,531,619 | 9/1970 | Broodman | 219/137 |
| 3,584,185 | 6/1971 | Mann et al. | 219/130 X |
| 3,617,690 | 11/1971 | Terai et al. | 219/137 |
| 3,646,311 | 2/1972 | Cameron et al. | 219/137 |
| 3,679,866 | 7/1972 | Arikawa et al. | 219/131 X |
| 3,737,614 | 6/1973 | Paulange | 219/131 X |
| 3,742,184 | 6/1973 | Arikawa et al. | 219/137 X |

OTHER PUBLICATIONS

Vagner et al., "Vertical Pulsating–Arc Welding With Powder–Filled Wire", Svar. Proiz., pp. 18–19, Vol. 17, 1970.

*Primary Examiner*—J. V. Truhe
*Assistant Examiner*—Clifford C. Shaw
*Attorney, Agent, or Firm*—Toren, McGeady and Stanger

[57] ABSTRACT

In welding iron, steel, and nonferrous alloys, the wire feed is changed periodically and in synchronism with periodic changes of the electric welding current to establish a previously defined relation between the welding current value and the arc length. The welding current is varied between one producing a spray transfer arc and a current just maintaining the arc.

20 Claims, 23 Drawing Figures

METHOD FOR WELDING IRON STEEL AND NONFERROUS ALLOY

This is a continuation of application Ser. No. 188,211, filed Oct. 12, 1971 now abandoned.

This invention relates to an improvement of the consumable wire electrode arc welding method for welding iron, steel and nonferrous alloy in which a welding electric current is changed periodically.

In changing a welding electric current periodically by feeding a welding wire at a constant speed, the melting speed of the wire increases in the period when the welding electric current is increased, thus lengthening the arc length toward the welding contact tip, and in some instances in an extreme case the arc is formed at the front end of the tip and the tip is lost by fusion. On the contrary, in the period when the welding electric current is decreased, the melting speed of the wire decreases, thus shortening the arc length, and in some instances in an extreme case the wire runs into molten pool and solidifies therein or is broken by fusion explosively forming spatter. It goes without saying that no satisfactory welding can be made in such instances.

The object of the present invention is to improve such defects. In this invention, for the purpose of limiting the welding heat input, improving the quality of the weld such as to prevent dropping of weld bead, preventing the formation of bead with poor appearance and etc. in practicing the welding of steel work and the like, the welding electric current is changed periodically and, at the same time, the feed rate of weld wire is changed synchronizing with the change of the welding electric current. And, in order to obtain a continuous bead, the travel speed is also changed in synchronization with the current changes.

This invention relates on the other hand to a method for welding iron, steel and nonferrous alloy in which welding can be made in all positions and particularly in the vertical and overhead weldings.

The present invention relates to a process for welding steel in all of the positions, particularly suitable for the all-round continuous welding of the butt portion in a butt welding of a cylindrical body, such as an iron pipe.

Now, the invention will be explained in detail according to the drawings attached. In the drawings:

FIGS. 3–6 show the practical examples of the locus of wire tip in weaving the wire tip: FIG. 4 being the case when the weaving frequency of the wire tip is numerous, FIGS. 4(a) and (b) being the case when the groove is welded layer by layer, and FIGS. 5 and 6(a), (b) being the case when fillet welding is made;

FIGS. 11 and 12, respectively a view for explaining a welding process in accordance with the present invention; (a), (b) and (c) in FIG. 11 respectively a view for explaining the case of welding with various numbers of wires to be used.

Figure 2A:
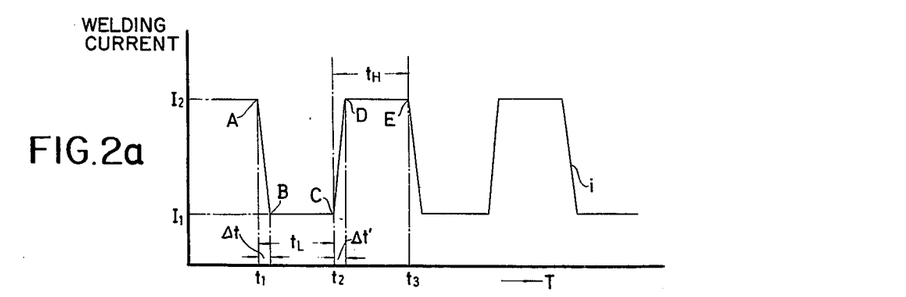
FIGS. 2(a) and 2(b) are explanatory drawings showing the change of welding current $i$, and of wire feed into $v$ against time T.
Figure 2B:
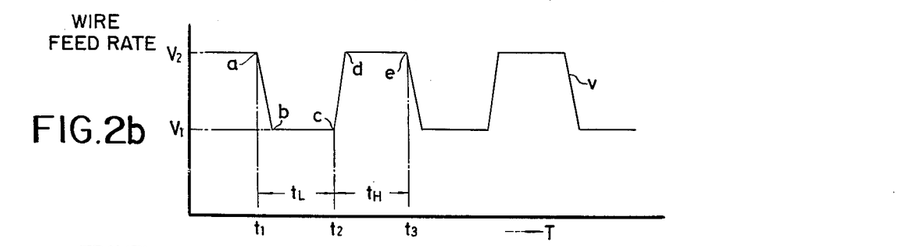

As obvious from FIGS. 2(a) and 2(b), the welding electric current $i$ is changed periodically for the purpose as above mentioned, namely the reduction of the welding electric current from a large current $I_2$ is commenced at point $t_1$ to reach at a small current $I_1$ after a short period $\Delta t$, the increase is commenced at $t_2$ to reach at a large current $I_2$ after a short period $\Delta t'$, the reduction is commenced again at $t_3$, and similar control is repeated. As a result, the welding electric current is small in period $t_L$ between $t_1$ and $t_2$ and is large in period $t_H$ between $t_2$ and $t_3$, thus the current changes periodically nearly as a rectangular wave shape as shown in the figure with A, B, C, D, E .... In order to maintain a long arc length when the current is large so as to transfer molten metal by spraying, and in order to maintain a short arc length when the current is small so as to transfer molten metal by short-circuiting the wire feed rate $v$ is defined to change periodically, synchronizing with the change of the welding electric current, as a high speed $V_2$ in period $t_H$ and a low speed $V_1$ in period $t_L$ and forming a nearly rectangular wave shape via a, b, c, d and e as shown with continuous lines in FIG. 2b.

Figure 2C:
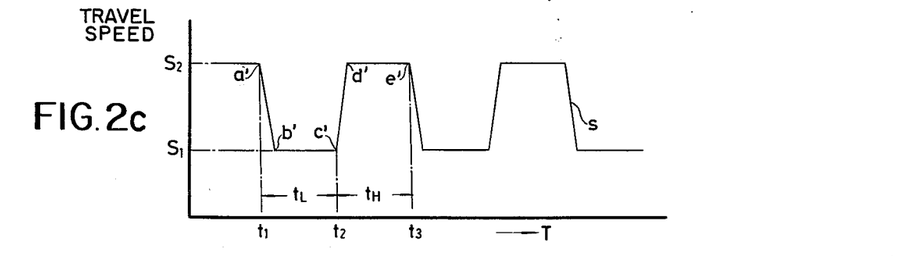
FIG. 2(c) is an explanatory drawing showing further the change of travel speeds against time T.

In this invention, further, for the purpose of preventing the periodic change of the shape of weld bead or the discontinuity of weld bead occurring synchronized with the periodic change of the welding electric current value and the wire feed rate, travel speeds is changed as shown in FIG. 2c. At the same time when the electric current $i$ is commenced to change from a large current $I_2$ to a small current $I_1$ at $t_1$, travel speed $s$ is changed from a high speed $S_2$ to a low speed $S_1$, and at the same time when the current is commenced to change from a small current $I_1$ to a large current $I_2$ at $t_2$, travel speed is changed from a low speed $S_1$ to a high speed $S_2$. As a result, travel speed changes also synchronizing with the electric current $i$ nearly as a rectangular wave shape via $a'$, $b'$, $d'$ and $e'$. The values for travel speed $S_1$ and $S_2$ are previously defined so that these values balance completely with the welding electric current $I_1$ and $I_2$, thus the shape of weld bead becomes nearly the same.

By the periodical changes of the electric current $i$, the welding wire feed rate $v$ and travel speed in such a manner, the welding which is impossible by a continuous arc becomes possible. For instance, in the vertical welding and overhead welding, unless the electric current is lower than in the flat welding, the weld metal droops, when the drooping once occurs the weld metal flows down in succession and in some instances the perforation occurs at last. In such an instance, while the shape and appearance of the weld bead become satisfactory in the first place when the welding is carried out by using a low electric current, such defects as the formation of cold-lapping owing to insufficient wetting"

with the base metal and lack of fusion owing to the low electric current occur frequently. Particularly, in the outdoor welding, as the accuracy of the groove cannot be expected severly, these defects occur quite easily, and it is the present status that the industrialization is fairly difficult. In such a case, good penetration and wetting with the base plate can be secured by using a large electric current according to this invention, thus enabling to obtain an excellent weld.

In order to practice the welding of this invention completely, it is necessary to define the period corresponding to the welding electric current value. According to our experiment, when the period is very short, for instance, such as 1/25–1/120 seconds as in the pulse arc welding, the weld metal does not solidify completely, and the object of the invention cannot be attained. It is necessary to define the periods $t_L$ and $t_H$ relatively long such as 0.1–3 seconds. These values are naturally to be controlled suitably, because the velocities of fusion and solidification change according to the thickness of the work, the size of construction article and the welding condition (particularly to the electric current value). Periods $t_L$ and $t_H$ vary of course according to the welding position, and particularly about 0.5–3 seconds for the vertical and overhead weldings and 0.1–2.5 seconds for the flat and horizontal weldings are suitable.

In applying the inventive method for the vertical welding and the overhead welding, the electric current value $I_2$ is defined so large to energize a spray type transfer that good penetration and wetting with the base plate can perfectly be secured, and the value $I_1$ is defined so small as the weld arc does not disappear scarcely. Then the fusion and silidification of the weld metal is repeated periodically, the formation of droop due to the formation of excessive molten metal does not take place and the periodic change of the bead shape does not occur, thus an excellent welding becomes possible. Mechanical properties of the weld metal are also improved, because the weld does not solidify continuously and its structure becomes complicated. While a usual welding speed, may be used when the electric current value is large as $I_2$, the speed should be very slow or may completely be interrupted when the current is so small as the arc does not disappear scarcely, because the melting of weld wire takes place only slightly.

To change the welding electric current and the wire feed rate independently, for instance, such means as follows may be applicable: To change the welding electric current in a direct current welder using a magnetic amplifier, the controlling current of the magnetic amplifier is changed periodically.

To change the wire feed rate and travel speed periodically, the supply current for the wire feed motor and the welder traveller motor, respectively, is changed periodically.

The method of this invention can be applied for various kinds of welding, including the gas-shielded welding using a conventional solid wire as well as, for instance, the gas-shielded and non gas-shielded welding using a tubular wire, and the submerged arc welding.

Figure 7A:
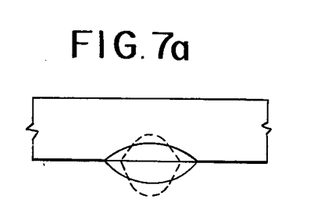
FIG. 7 shows the outline of the shape of weld bead in overhead and vertical welding.
Figure 7B:
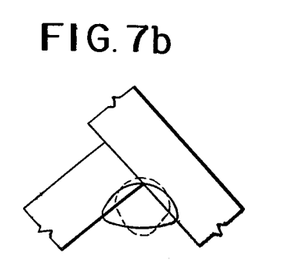
Figure 7C:
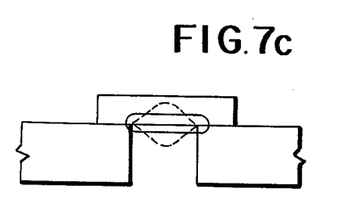

When the locus of the tip of weld wire is straight, the shape of the bead in the notch becomes convex, for instance, as shown with dotted line in FIGS. 7, (a)–(c), according to the position of the work to be welded in the vertical and overhead welding, and the former layer cannot be fused completely in the welding of the next layer, thus such defects are broken out that fillet occurs, a necessary leg length cannot be obtained in the fillet welding, and the depositing of next layer becomes difficult in fillet welding in which a long leg length is wanted.

To improve such defects, a further characteristic of this invention is, in the welding by changing the welding electric current, the wire feed rate and the welding speed periodically, to synchronize weaving of weld wire with the periodic change of the electric current, the wire feed rate and the welding speed. Thus, the formation of bead having remarkably convex shape in the vertical and overhead position can be prevented, and a satisfactory bead as shown with continuous line in FIGS. 7, (a)–(c) is obtainable.

To move the wire tip periodically in order to prevent the formation of bead having excessive convex shape in this invention will be explained in the following.

Figure 2D:
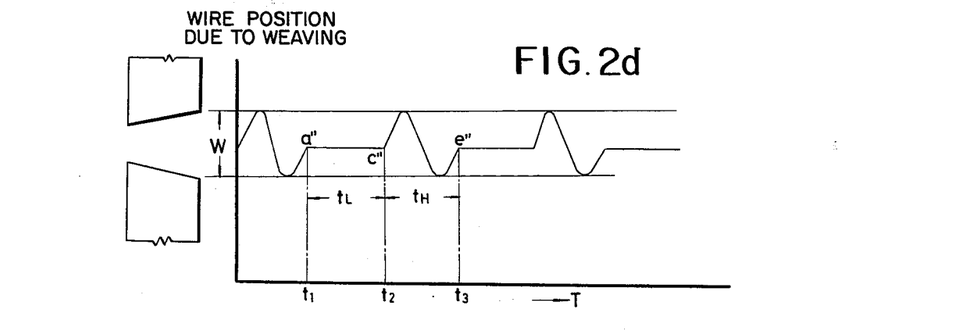
FIG. 2(d) is an explanatory drawing showing the locus of the tip of weld wire when the wire tip is weaved.

FIG. 2(d) shows the locus of the wire tip when the wire tip is weaved in the welding of groove in vertical or overhead position. As obvious from the figure, the wire tip plays a simple harmonic motion with a period of $t_H$ only during the period with a large electric current $t_H$. This simple harmonic motion begins at the center of the groove and moves with one cycle during $t_H$. During the period $t_L$ with a small current, the tip is fixed at a constant position (in this instance, at the center of the groove) without weaving in order to keep the small current arc stable. It goes without saying that the vibration width w of the wire should be altered in accordance with he necessary bead width. In the V-shaped groove, it is necessary to make the back side width smaller and the front side width broader. By giving such a vibration synchronizing with the periodic change of welding electric current, wire feed rate and welding speed, a in the same phase or in the inverse phase so as to distribute uniformly the molten metal in the groove bead having a good shape — not excessively convex — and with a sufficient wetability against the wall of the groove can be obtained.

While the locus of the wire tip in FIG. 2(d) is of a simple harmonic motion, such locus with a triangular wave shape giving a uniform motion may naturally be utilized.

Various welding methods by giving a periodic motion to the wire have frequently been adopted. However, as they are always with a constant electric current, a large current cannot be applied after all, and they have such defects as an lack of fusion and the formation of cold-lapping. On the contrary, when the weaving system is combined with the periodic change of the welding electric current, wire feed rate and, welding speed as in this invention, a large electric current can be applied and a very excellent bead is obtainable. When such a procedure is applied for such a welding in which usually a steel cover plate, a steel cooling plate cooled with water or the like is obliged to use to prevent the flow out of molten metal, such a plate can be omitted and the process can be simplified. This system differs also from the conventional welding system of weaving the wire in stopping the weaving of wire in the period $t_L$ with a small electric current.

Figure 3:
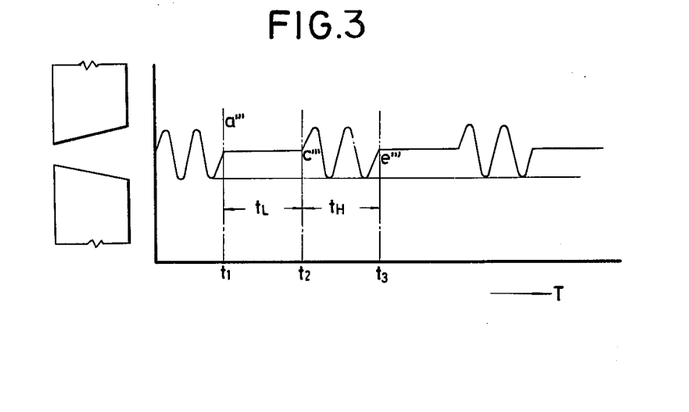
Figure 4A:
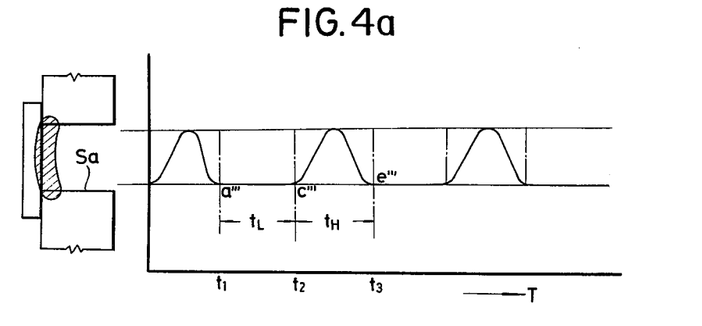

FIG. 3 shows an example of increasing the frequency of wire weaving. In FIG. 4(a), two cycle simple harmonic motion is given during the large current period $t_H$ as shown with a curve between points $c'''$ and $e'''$. During the small current period $t_L$, the weaving of wire tip is suspended as shown with a straight line between points $a'''$ and $c'''$. The frequency of the cycle can of course be increased, and there is a tendency that the ripple of bead becomes fine in increasing the frequency. In any case in FIG. 2(d) and FIG. 4, the simple harmonic motion can naturally be commenced from the wall side of the groove.

Figure 4B:
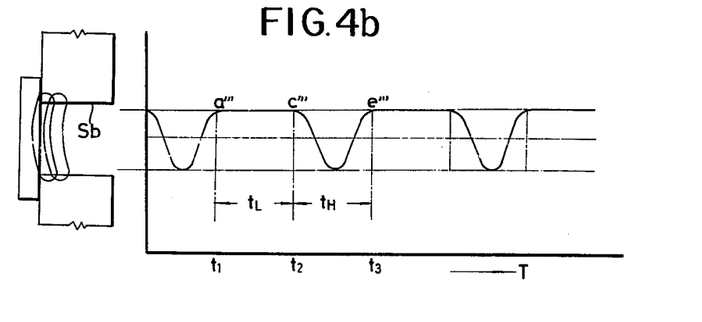

FIG. 4 shows an example in which the weld metal is layered in a I shaped vertical welding and the weaving of wire in period $t_H$ is commenced from the wall side of the groove. FIG. 4(a) shows the case in which the weaving of the wire is commenced from the wall side $S_a$ of an I shaped groove, and thus the small current arc can be held stably between the wall of the groove and the wire tip. FIG. 4(b) shows the case in which the weaving of the wire is commenced from the wall side $S_b$ of the I shaped notch. By repeating such a cycle alternately, an excellent weld can be obtained.

Figure 5:
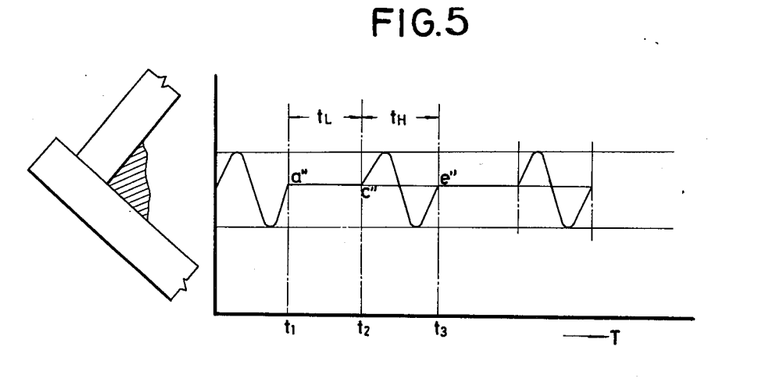
Figure 6A:
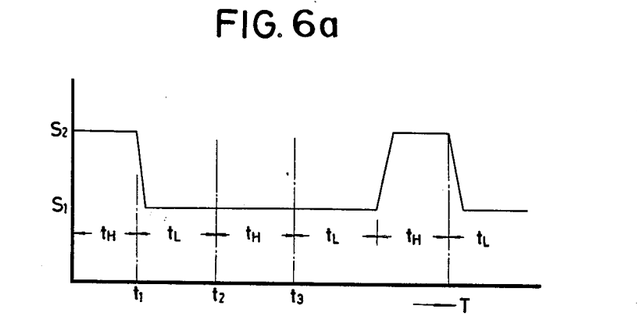
Figure 6B:
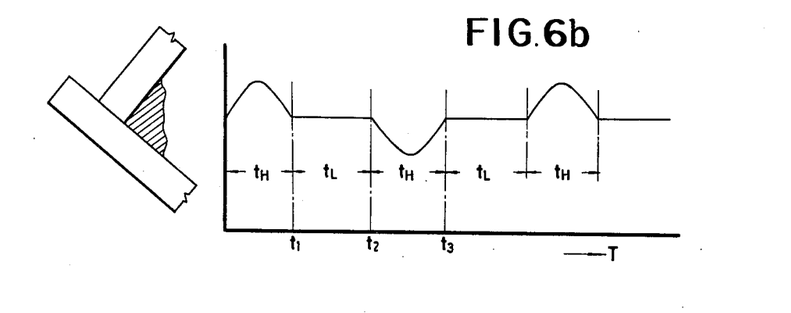
Figure 8:
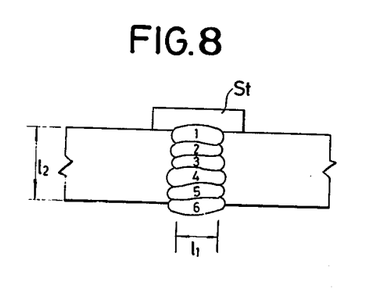
FIG. 8 shows the outline of the shape of groove in Example 4.

FIGS. 5 and 6 show the examples in applying this system to the fillet welding. FIG. 5 is the case in which the weaving is one cycle in a large current period $t_H$. FIG. 6 is the case to obtain particularly a fillet bead with a long leg length, one side is welded in the first $t_H$ period and then the other side is welded by suspending the travel in the meantime. Namely, in the procedure in FIG. 8 the traveller is moved every other $t_H$ period, and in the intermediate $t_H$ period, the traveller is suspended and the wire is woven synchronizing with the change of electric current and the wire feed rate. The wire weaving is half a cycle in $t_H$ period.

By combining the relation between the welding speed and the wire weaving in different ways, some of which are as above explained, an excellent weld having a satisfactory shape can be obtained.

On the other hand, the present inventors found that, while the mechanical properties of the weld become excellent when the small electric current value is selected so small as the arc does not disappear scarcely as the weld metal is repeatedly fused and solidified, there is a danger of the disappearance of the arc in such an instance owing to a certain reason. When the arc once disappears, no generation of the arc takes place until the wire tip begins to contact with the master work or with the pond of fused metal. In this instance, as the wire run to the master work or into the pond of fused metal with a tolerable speed, the wire is adhered at the time of contact, cut off explosively by the fusing action, spattered and burnt back (burnt up to the torch), thus making the arc unstable. To prevent such obstacles, a high frequency electric current is superposed, if necessary, to the welding electric current in this invention.

The procedure of superposing a high frequency electric current will be explained in detail according to FIG. 9.

Figure 9:
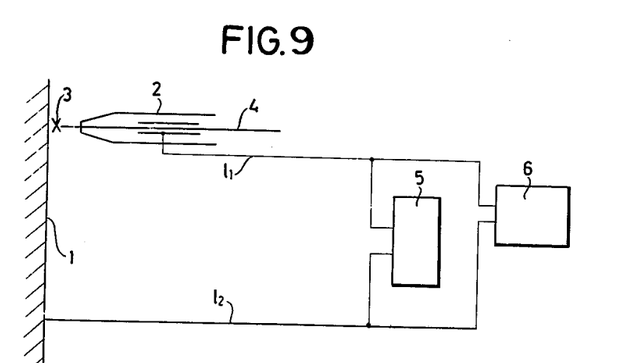
FIG. 9 is a drawing showing the outline of the apparatus to perform this invention by superposing a high frequency electric current to the welding electric current.

In FIG. 9, 1 is a steel plate to be welded, 2 is a welding torch, 4 is a weld wire fed from said torch and 5 is an electrical source for welding. The one output terminal of the electrical source 5 is connected via a load wire $1_1$ to the weld wire 4, and the other output terminal thereof is connected via a lead wire $1_2$ to the steel plate 1. Thus, an electric arc 3 is produced between the steel plate 1 and the tip of the weld wire 4, and the welding is carried out under varying arc current, weld wire feed rate and, if necessary, transfer speed of the welding torch — and accordingly the welding speed — as shown in FIG. 2.

In superposing a high frequency electric current to the welding electric current in this invention, a high frequency current generator 6 is connected parallel to the electrical source for welding 5, and a high frequency electric current from said high frequency current generator 6 is supplied, superposed to the welding electric current from the electrical source 5, to the weld. Thus, a spark discharge is produced between the tip of wire 4 and the steel plate 1 or the pond of fused metal, leading to the production of arc by the welding electric current.

By superposing a high frequency electric current, the regeneration of arc in the moment when the arc 3 between the weld wire and the master work — the steel plate to be welded — disappears becomes quite easy. Without superposing such a high frequency electric current, the unstability of arc and other defects as above-mentioned occur when the arc once disappears owing to a certain reason. It goes without saying that no satisfactory welding can be executed when such an unstable condition is continued, and when an unstable condition once occurs, a stable condition can hardly be restored. Therefore, it is important to prevent the occurrence of such an unstable condition, and to superpose a high frequency electric current in this invention is quite effective in this respect.

In this invention, an alternating-current of, for instance, several hundreds kilo hertzes and several thousands volts is used as a high frequency electrical source. To superpose a high frequency electric current, such methods as a condenser connection system and a series connection system by using a coreless transformer may be applicable. While the superposition of a high frequency electric current may be continuous, it is effective that the superposition is applied only during the small current period $t_L$, only at the transition from a large current to a small current — at this moment the arc disappears easily — or only when the arc disappears.

When the regeneration of arc goes smoothly by superposing a high frequency electric current, it is possible to cut off the electric current completely during the small current period, thus enabling to simplify the construction of the electrical source. In this instance, it is necessary of course that the control of wire feed rate, including the suspension of supply, should more perfectly be practiced.

As a process for all position welding, there has hitherto been used a gas shield arc welding process, utilizing a short-circuit, or a gas shield arc welding process, utilizing a spray transfer. In the former, such a defect as lack of fusion or a cold-lapping due to a low welding current, is liable to be, while in the latter, these defects can be eliminated, but in case of vertical welding, the welding becomes unable to be performed with a vertical-up process owing to the hanging down of molten metal. It must be done with a vertical-down process. Accordingly, when such a butt joint as a pipe or an iron pipe is welded by a gas shield welding process of a spray transfer, the vertical-up process cannot be performed, whereby it becomes impossible to be continuously welded in one direction, so that it cannot be helped to use a so-called distribution system.

The distribution system means a system, in which the welding is performed as shown in FIG. 2, beginning at the top part A, through the right side part C to the bottom part B, and interrupted here one time, and again, now, from the part A through the left side part D to the part B. In this system, the welding is interrupted on the way. Therefore, it cannot be expected to increase efficiency. It is also afraid that defects may be caused in the jointing part of beads.

Therefore, it is the object of the present invention to provide a process for welding steel, in which such defects as lack of fusion a cold-lapping or others cannot be generated and vertical upward welding can be easily done, so that the whole circumference of such a cylindrical body as an iron pipe or the like can be continuously welded from one direction without the distribution system being used.

Figure 1:
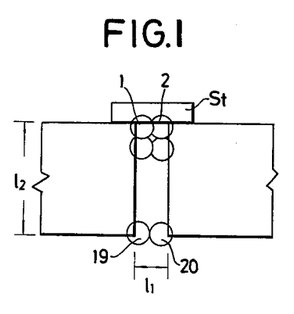
FIG. 1 is the drawing showing the outline of the shape of groove used in the examples of this invention.

The hanging down of molten metal at the time of vertical upward welding can be prevented by that the welding current, the wire feed rate and, the welding speed are synchronized withe each other to be periodically varied. And the quantity of deposited metal, deposited per pass, is generally small in the vertical-down welding, while it is large in the vertical-up welding. Therefore, when the butt jointing part of a cylindrical body is continuously welded, it is sometimes that the quantity of weld metal differs between the time of the welding down and the time of the welding up. In such a case, for example, three welding wires are used to perform a three-electrodes welding at the time of the welding down, while only one electrode is continued and the arcs of the other twos are extinguished to perform an one-electrode welding at the time of the welding up. Thus, the quantity of weld metal can be regulated to make the thickness of deposition constant. As the result, the all-round welding for such a cylindrical body as shown in FIG. 1 can be performed in a continuous circle of A-C-B-D-A.

Further, according to the present invention, as above-mentioned, the number of welding wires to be used is adjusted, if necessary, in order to prevent the fluctuation in the quantity of weld metal between the time of vertical-up welding and the time of vertical-down welding. It is explained in FIG. 13, in which (a) shows the case of one wire; (b), the case of two wires; and (c), the case of three wires. By the change of the number of wires to be used, the number of pass is regulated per layer of deposition, so that the thickness of deposition can be controlled.

Some examples of the invention will be set forth in the following:

EXAMPLE 1

Vertical welding of steel plate with a thickness of 25 mm was carried out. Steel plate to be welded was JIS SM-58, 25 mm $t$, the wire was YM-18, 1.2 mm $\phi$ (SI 0.68, Mn 1.55%), the gas was AR + $CO_2$(10%) and the shape of groove was as shown in FIG. 2. In the figure, $l_1$= 12 mm, $l_2$= 25 mm and $S_t$ was a steel backing material. The welding condition was as follows:

| | | |
|---|---|---|
| welding electric current | $I_2$= 220 A | $I_1$= 60 A |
| wire feed rate | $V_2$= 7.4 m/min. | $V_1$= 2.0 m/min. |
| period | $t_H$= 1.0 sec. | $t_L$= 1.8 sec. |
| travel speed | $S_2$= 35 cm/min. | $S_1$= 0 cm/sec. |
| layer of welding | 5 layers (10 passes) (Welding condition for each pass was the same.) | |

Quality of the weld was as follows:
1. Joint tensile test (according as JIS Z-3121)

| test piece | tensile strength (kg/mm²) | ruptured at |
|---|---|---|
| 1 | 59 | masterplate |
| 2 | 61 | " |

2. Bending test (according as JIS Z-3123)
Both face bending and root bending were excellent.
3. Impact test

| test piece | temperature (°C) | absorption energy (kg - m) | |
|---|---|---|---|
| 1 | 0°C | 13.5 | |
| 2 | " | 14.0 | (mean value) 14.3 |
| 3 | " | 15.4 | |

EXAMPLE 2

Figure 10:
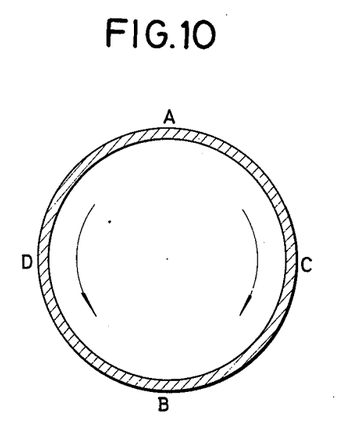
FIG. 10 illustrates a view for explaining a welding process in case of the object to be welded being a cylindrical body.
Figure 11A:
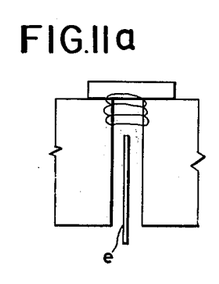
Figure 11B:
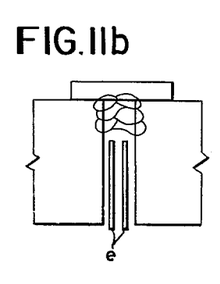
Figure 11C:
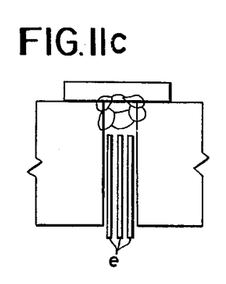
Figure 12:
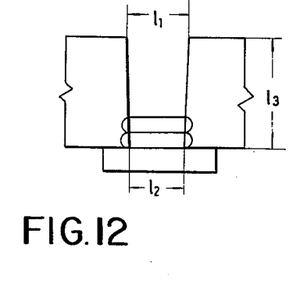
Figure 13:
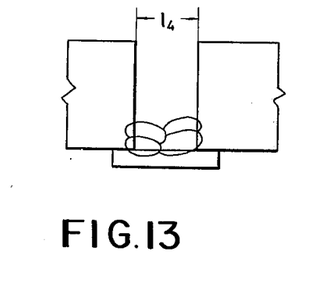
FIGS. 13 and 14, respectively a schematic view, showing the shape of beveling for the object to be welded in the embodiment examples of the present invention. In the drawings, e shows a welding rod.
Figure 14:
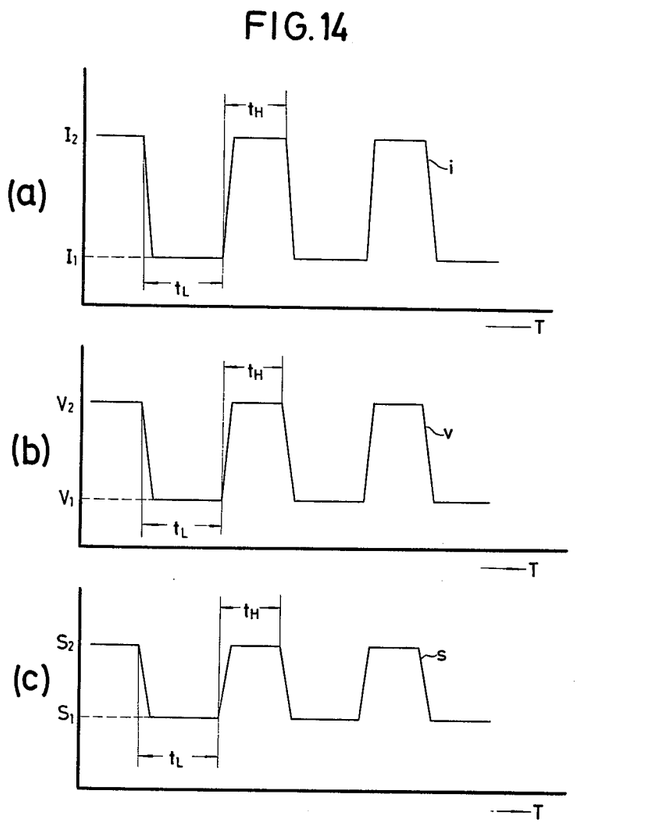

Examples 4 and 5 are to show the effect of weaving the wire tip. In Example 4, vertical welding of steel plate with a thickness of 25 mm was carried out. Steel work to be welded was JIS SM - 50, 25 mm $t$, the wire was YM - 26, 1.2 mm $\phi$ ($\phi$ Si 0.8, Mn 1.6%), the gas was Ar + $CO_2$(10%) with an amount of 25 l/min. and the shape of groove was as shown in FIG. 10. In the figure, $l_1$= 12 mm, $l_2$= 25 mm and $S_t$ was a steel backing material. The welding condition was as follows:

| | | |
|---|---|---|
| welding electric current | $I_2$= 260 A | $I_1$= 10 A |
| wire feed rate | $V_2$= 9.7 m/min. | $V_1$= 1.5 m/min. |
| period | $t_H$= 0.5 sec. | $t_L$= 1.9 sec. |
| welding speed | $S_2$= 50 cm/min. | $S_1$= 0 cm/min. |
| width of weaving | $W_2$= 10 mm, simple harmonic motion | $W_1$: not weaved, wire tip is at the center of groove |
| layers of welding | 6 layers (Welding condition for each pass was the same.) | |

Quality of the weld was as follows:
1. Joint tensile test (according as JIS Z-3121)

| test piece | tensile strength (kg/mm²) | ruptured at |
|---|---|---|
| 1 | 57.0 | base metal |
| 2 | 57.5 | " |

2. Bending test (according as JIS Z-3123)
Both face bending and root bending were excellent.
3. Impact test (according as JIS Z-3112)

| test piece | temperature (°C) | absorption energy (kg - m) | |
|---|---|---|---|
| 1 | 0°C | 11.0 | |
| 2 | " | 12.0 | (mean value) 11.5 |
| 3 | " | 11.5 | |

EXAMPLE 3

Another example of the vertical fillet welding was carried out by weaving the wire tip. Steel work to be welded was JIS SS-41, 20 mm $t$, the wire was YM - 26, 1.2 mm $\phi$ (Si 0.8, Mn 1.63%), the gas was Ar + $CO_2$(10%) with an amount of 25 l/min.
The welding condition (leg length 14 mm) was:

| | | |
|---|---|---|
| welding electric current | $I_2$= 220 A | $I_1$= 10 A |
| wire feed rate | $V_2$= 8.0 m/min. | $V_1$= 1.5 m/min. |
| period | $t_H$= 1.0 sec. | $t_L$= 1.9 sec. |
| welding speed | $S_2$= 20 cm/min. | $S_1$= 0 cm/min. |
| | $W_2$= 8 mm | $W_1$: not weaved. Wire tip is at the center of groove. |

Result of welding:
Bead with excellent shape and having equal leg length (14 mm) was obtained.

EXAMPLE 6

A vertical-up welding was performed with one wire.
1. kind of steel: SM - 50, 30 mm $t$
2. materials for welding: wire YM - 26, 1.2 mm $\phi$; gas Ar - $CO_2$(20%), 50 l/m
3. welding condition: the shape of beveling is as shown in FIG. 15, in which $l_1$= 9 mm, $l_2$= 6 mm, $l_3$= 30 mm. The welding current and others are as shown in the following table.

| | high | low |
|---|---|---|
| welding current | 320 - 340 A | 10A |
| arc voltage | 30 - 31 V | 15V |
| travel speed | 37.5 cm/m | 0 cm/m |
| timer setting | 0.7 sec. | 2 sec. |

4. The welding result:
4-1 Tension Test (based on JIS Z-3121)

| Test Piece | tensile strength kg/mm² | break-down |
|---|---|---|
| 1 | 56.0 | base metal |
| 2 | 57.5 | base metal |

4-2 Bending Test (based on JIS Z-3123)
The results of both the face-bend and root-bend tests are good.

EXAMPLE 7

A vertical-up welding was performed with two welding wires:
1. kind of steel: SM - 50, 30 mm $t$
2. materials for welding: wire YM - 26, 1.2 mm $\phi$ gas Ar - $CO_2$(20%), 50 l/m
3. welding condition: the shape of beveling is as shown in FIG. 16, in which $l_4$= 10 mm.

| | preceding electrode | | following electrode | |
|---|---|---|---|---|
| | high | low | high | low |
| welding current | 320 A | 10 A | 320 A | 10 A |
| arc voltage | 32 V | 15 V | 31 V | 15 V |
| welding speed | 43 cm/m | 0 | 43 cm/m | 0 |
| timer setting | 0.7 sec. | 2 sec. | 0.7 sec. | 2 sec. |

4. The welding result:
4-1 Tension Test (based on JIS Z-3121)

| Test Piece | tensile strength (kg/mm²) | break-down |
|---|---|---|
| 1 | 56.0 | base metal |
| 2 | 57.5 | base metal |

4-2 Bending Test (based on JIS Z-3123)

The results of both the face-bend and root-bend tests are good.

The present invention is not limited merely to the examples above explained, and may be modified in different ways within the scope of claim.

What is claimed is:

1. The method of welding metals which comprises striking an arc with a metal electrode, supplying a first value of current to the arc through the electrode, maintaining the arc while changing the current so as to apply a second value to the arc, maintaining the arc while changing the current back and forth between the first and second values every 0.3 to 3 seconds, the first value being just sufficient to maintain the arc and substantially avoid transfer of metal beyond a trace through the arc, the second value being substantially larger than the first value and sufficient for producing a spray transfer of metal, and feeding the metal electrode into the arc so as to permit formation of the respective arcs, moving the arc and the metal electrode generally along a path and weaving the arc and electrode transverse to the path, changing the speed of movement of the electrode in the path synchronously with the changes in current and initiating and halting the weaving of the welding electrode in synchronism with the periodic change of the welding current.

2. The method as in claim 1, wherein the current is supplied through the metal electrode and the electrode is consumable, and the step of feeding the metal electrode includes varying the rate at which the metal is fed in synchronism with the current values so as to maintain the respective type of arcs while sustaining the first current and second current.

3. The method as in claim 2, wherein the feeling rate and the component of the speed along the direction are varied so that the feed and speed are greatest when the current is greatest.

4. The method as in claim 2, wherein the second current exceeds the first current value by at least an order of magnitude.

5. The method as in claim 2, wherein the step of feeding occurs at a first rate and a second rate in synchronism with the first current value and the second current value, and wherein the second rate is greater than the first rate.

6. The method as in claim 5, wherein the second value of current is at least twice the first value of current.

7. The method as in claim 5, wherein the second current value is at least 2.6 times the first current value.

8. The method as in claim 5, wherein the second current value exceeds the first current value by substantially an order of magnitude.

9. The method as in claim 2, wherein the metal is in the form of a wire and forms a welding tip, wherein during welding the welding tip is moved in synchronism with the change in current values.

10. The method as in claim 9, wherein the second value of current is at least twice the first value of current.

11. The method as in claim 9, wherein the second current value is at least 2.6 times the first current value.

12. The method as in claim 9, wherein the second current exceeds the first current value by at least an order of magnitude.

13. The method as in claim 2, wherein supplying current to the arc includes supplying a high frequency electric current.

14. The method as in claim 2, wherein the arc is formed on a surface of a workpiece other than a surface which faces upwardly from the workpiece.

15. The method as in claim 2, wherein metal transferred through the arc during the second value of current is allowed to cool and at least partially solidify during the first value of current.

16. A method as in claim 1, wherein the second value of current is at least twice the first value of current.

17. The method as in claim 2, wherein the second value of current is at least twice the first value of current.

18. The method as in claim 1 wherein the rate at which the electrode is fed and the component of the speed along the direction are varied so that the rate of feeding and speed are greatest when the current is greatest.

19. The method as in claim 1, wherein the second current value exceeds the first current value by substantially an order of magnitude.

20. The method as in claim 1, wherein a plurality of electrodes are fed simultaneously and in synchronism with each other.

* * * * *